J. Autenrieth,

Shoe Fastening,

No. 2,176. Reissued Feb. 20, 1866.

Witnesses:
F. W. Coombs
Geo. W. Reed

Inventor:
Jacob Autenrieth
per Munn & Co
Attorneys

N. PETERS, PHOTO-LITHOGRAPHER, WASHINGTON, D. C.

UNITED STATES PATENT OFFICE.

CHARLES GOODYEAR, JR., OF NEW YORK, ASSIGNEE OF JACOB AUTENRIETH.

EYELET FOR LACING SHOES.

Specification forming part of Letters Patent No. 37,328, dated January 6, 1863; Reissue No. 2,176, dated February 20, 1866.

*To all whom it may concern:*

Be it known that JACOB AUTENRIETH, of the city and county of Philadelphia, and State of Pennsylvania, has invented a new and improved method of an eyelet or device for lacing boots, shoes, &c.; and I hereby declare that the following is a full, clear, and exact description of the same, reference being had to the accompanying drawings, forming part of this specification, in which—

Figure 1:
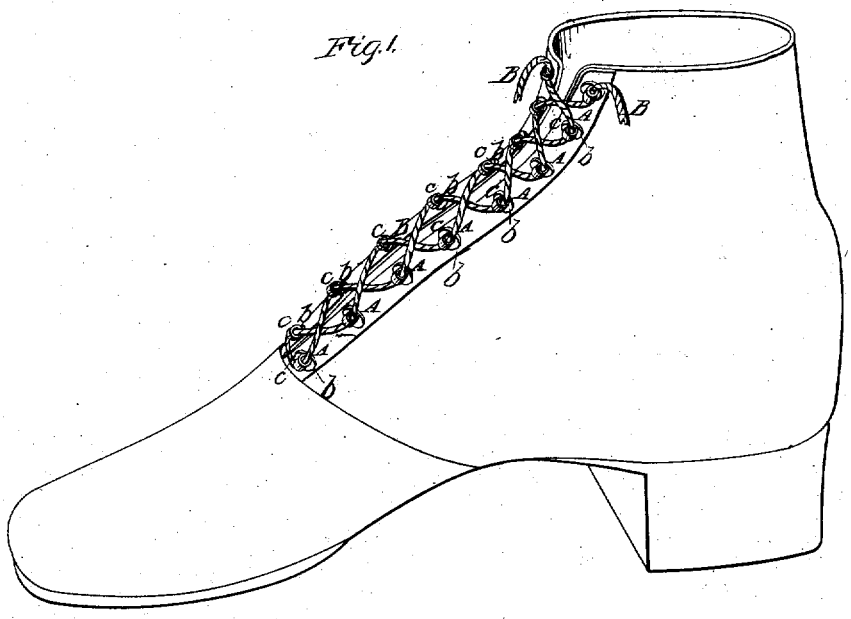
Figure 2:
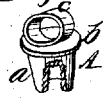
Figure 3:
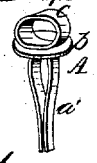

Figure 1 represents a perspective view of a shoe provided with a lacing in accordance with this invention. Fig. 2 is a perspective view, partly in section, of the eyelet or lacing device detached. Fig. 3 is a modification of the same.

To enable those skilled in the art to make and use this invention, I will now proceed to describe the manner in which the same is or may be carried into effect.

With eyelets of the ordinary construction, such as are in general use for lacing shoes, the lacing passes alternately above and below the edges of the leather, and the friction between the lacing and the parts of the shoe is so great that in order to put on the shoe each section of the lacing has to be pulled out separately, and after the foot has been entered each section of the lacing has to be strained separately, thus rendering the operation of lacing a shoe very tiresome and disagreeable. In many cases it becomes necessary to pull the ends of the lacing entirely out of the upper or last eyelet in order to be able to enter the foot into the shoe, and after the foot is entered and the lacing has been strained it is extremely difficult to pass the ends of the same back through the last or upper eyelet, because the leather bears flat down upon the foot, and in order to pass the lacing through the eyelets, it (the leather) has to be turned back. These difficulties are completely obviated by the use of this invention.

According to this invention, the metallic eyes, instead of being fastened into, are secured onto, the leather or upper of the boot or shoe by means of an auxiliary eyelet, prongs, or other fastening device in a position transversely to the line of lacing and in planes vertical relatively to the upper. The eyes are parallel, or nearly so, to each other, instead of being situate in the same plane, and in the lacing, instead of running through the leather, winds its way through the eyelet without, however, traversing the leather.

In the drawings, A is the eyelet, constructed with a tubular projection, *a*, similar to an ordinary eyelet, or it may be made with two prongs, *a'*, Fig. 3. By this tubular projection or prongs the eyelet is fastened to the upper by being passed through the leather and being punched or turned over at the inner surface thereof. The tubular projection *a* or prongs *a'* may be covered with a flat disk or washer, *b*, the edge of which bears down on the outer surface of the leather and gives to the eyelet a good hold. This disk, if such be used, bears the loop or eye *c* through which the lacing B is passed, as clearly shown in Fig. 1 of the drawings. By these means the lacing is kept entirely above the upper surface of the leather, and, on being drawn tight, it slips easily through the eyes *c*. The edges of the shoe can also be spread simply by pulling them apart without releasing severally the sections of the lacing; and after the foot has been entered the edges of the shoe are closed up by pulling the ends of the lacing; and if the lacing should pass out of one of the eyelets, or if a new lacing is to be introduced, its ends can be readily passed through the loops, whether the shoe be on or off.

This invention is also applicable to lacing corsets and other similar purposes.

Having thus described the said invention, I would observe that this invention is susceptible of many modifications without departure from the principle thereof.

What is claimed, therefore, as the invention of the said JACOB AUTENRIETH is—

1. A shoe-lacing with its eyelets and cords, constructed and arranged substantially as described.

2. The metallic lacing eyelet or loop, constructed and arranged, substantially as herein described, so that the lacing-cord shall run through the same without traversing the leather or material of the shoe or other article of wearing apparel to be laced.

3. The arrangement of the metallic eyelet or loop transversely in relation to the fastening device, as herein described, so that the said eyelets or loops when fastened onto the leather or material shall be situated in vertical planes relatively to the surface of the leather or material, as set forth.

In testimony whereof I have signed my name to this specification before two subscribing witnesses.

CHAS. GOODYEAR, JR.

Witnesses:
WILLIAM MONAGHAN,
JAMES MALCOLM.